(12) United States Patent
Gentili et al.

(10) Patent No.: US 10,949,537 B2
(45) Date of Patent: Mar. 16, 2021

(54) SECURE FIRMWARE PROVISIONING AND DEVICE BINDING MECHANISM

(71) Applicant: STMicroelectronics, Inc., Coppell, TX (US)

(72) Inventors: Maurizio Gentili, Santa Clara, CA (US); Massimo Panzica, Biancavilla (IT)

(73) Assignee: STMICROELECTRONICS, INC., Coppell, TX (US)

( * ) Notice: Subject to any disclaimer, the term of this patent is extended or adjusted under 35 U.S.C. 154(b) by 184 days.

(21) Appl. No.: 16/175,699

(22) Filed: Oct. 30, 2018

(65) Prior Publication Data

US 2019/0171819 A1 Jun. 6, 2019

Related U.S. Application Data

(60) Provisional application No. 62/593,749, filed on Dec. 1, 2017.

(51) Int. Cl.
*G06F 12/14* (2006.01)
*G06F 8/65* (2018.01)
*G06F 21/57* (2013.01)

(52) U.S. Cl.
CPC ........ *G06F 21/572* (2013.01); *G06F 12/1408* (2013.01); *G06F 21/575* (2013.01)

(58) Field of Classification Search
CPC .. G06F 21/572; G06F 12/1408; G06F 21/575; G06F 8/65
See application file for complete search history.

(56) References Cited

U.S. PATENT DOCUMENTS

| | | | |
|---|---|---|---|
| 5,604,887 A * | 2/1997 | Naidu | G06F 3/0622 703/27 |
| 5,652,868 A | 7/1997 | Williams | |
| 2004/0057579 A1* | 3/2004 | Fahrny | H04L 63/0428 380/44 |
| 2005/0216755 A1* | 9/2005 | Lipsky | G06F 21/10 713/193 |
| 2008/0046737 A1* | 2/2008 | Mihm | G06F 12/1408 713/176 |
| 2008/0209553 A1* | 8/2008 | Lu | G06F 12/1433 726/22 |

(Continued)

OTHER PUBLICATIONS

Becher et al., "Tampering with Motes: Real-World Physical Attacks on Wireless Sensor Networks," *International Conference on Security in Pervasive Computing*, Apr. 18-21, 2006, York, United Kingdom, pp. 104-118.

*Primary Examiner* — Darren B Schwartz
(74) *Attorney, Agent, or Firm* — Seed IP Law Group LLP

(57) ABSTRACT

Electronic computing devices provide a method to update firmware. The method includes receiving a firmware image at an electronic device, the electronic device having a processor and a memory arranged to store instructions executed by the processor. In the electronic device, a unique device identifier is retrieved and a random number is generated. The generated random number is securely stored. The random number and a representation of the unique device identifier are computationally combined to create a device-binding value, and an address-offset is generated from the device-binding value. The firmware image is stored in the memory at the address-offset.

20 Claims, 8 Drawing Sheets

(56) References Cited

U.S. PATENT DOCUMENTS

| | | | |
|---|---|---|---|
| 2009/0116650 A1* | 5/2009 | Cizas | H04L 9/0822 |
| | | | 380/278 |
| 2013/0061032 A1* | 3/2013 | Suginaka | G06F 9/4401 |
| | | | 713/2 |
| 2013/0121488 A1* | 5/2013 | Kang | H04L 9/0894 |
| | | | 380/44 |
| 2013/0339734 A1* | 12/2013 | Vernia | H04L 63/0428 |
| | | | 713/168 |
| 2014/0032935 A1* | 1/2014 | Kim | G06F 21/6218 |
| | | | 713/193 |
| 2014/0136807 A1* | 5/2014 | Brown | G06F 21/44 |
| | | | 711/164 |
| 2014/0351584 A1* | 11/2014 | Checcucci | H04L 67/06 |
| | | | 713/164 |
| 2016/0021121 A1 | 1/2016 | Cui et al. | |
| 2016/0359620 A1* | 12/2016 | Pebay-Peyroula | H04L 9/0869 |
| 2017/0264596 A1* | 9/2017 | Maydanik | G06F 21/606 |

\* cited by examiner

SECURE FIRMWARE PROVISIONING AND DEVICE BINDING MECHANISM

BACKGROUND

Technical Field

The present disclosure generally relates to secure firmware image loading and secure firmware image updating. More particularly, but not exclusively, the present disclosure relates to an electronic device that securely binds a firmware image to a specific electronic device.

Description of the Related Art

A known microcontroller boots, and re-boots, in a known way. When the microcontroller is powered up or reset, a reset vector will automatically cause an instruction counter of a processor to be reset or otherwise loaded with a known address. One or more instructions will be fetched from memory at or around the known address, and the one or more instructions will be executed by the processor. In some cases, the first and subsequent instructions fetched from the known address are instructions of one or more boot-loaders. In other cases, the first instruction fetched from the known address is a jump instruction, which causes execution in the processor to begin from a particular boot-loader starting address. In still other cases, particularly in some classes of embedded devices, instructions that carry out the operations of the given device begin without any boot-loader.

One feature common to devices that include microcontrollers is that after booting, or re-booting, the processor of the device will execute instructions from a known instruction address. In these cases, each "same" device will execute instructions from a same instruction address. For example, if the device is a particular model of smart watch, then each smart watch of that particular model will follow a same boot procedure, and a same re-boot procedure, such that the initial instruction address will be the same for each one of that particular model of smart watch.

FIG. 1 is an operations model 1 of a conventional electronic computing device 2. The conventional electronic computing device 2 includes functional logic 4 to fulfill the purpose of the conventional electronic computing device 2. For example, if the conventional electronic computing device 2 is a pedometer, the functional logic 4 may include a three-dimensional motion sensor and corresponding circuitry arranged to count a user's steps. As another example, if the conventional electronic computing device 2 is a smartphone, the functional logic may include power circuitry, security logic, and user interface circuitry such as display logic, touchscreen logic, audio logic, tactile logic, and the like.

The functional logic 4 may include any other functional logic generally found in a conventional electronic computing device 2, and such logic is not expressly identified so as to not obscure other logic that is discussed in the present disclosure. For example, the functional logic 4 may include administrative circuits, interrupt processing circuitry, direct memory access (DMA) circuitry, and optionally other circuits too. The administrative circuitry may include any number of logic modules, and such logic may be arranged to include or otherwise manage clocks, oscillators, timers, power modes, an audio interface, analog/digital features (e.g., an analog-to-digital controller (ADC); a digital-to-analog controller (DAC)), communication interfaces, debug interfaces, and the like. Interrupt processing circuitry processes planned and unplanned interruptions to the normal operations of the processor 12, which may be synchronous or asynchronous to a system clock. Examples of planned interruptions include expiring timers, certain I/O control circuit inputs (e.g., keypresses, serial or parallel incoming data, and the like). Examples of unplanned interrupts include imminent-loss-of-power interrupts, resets, error traps, watchdog timeouts, and the like. And DMA circuitry operates to copy data from one memory or peripheral location to another memory or peripheral location. Other functional logic is also contemplated.

In the conventional electronic computing device 2, a processor 12 is arranged for communications with memory 14. Memory 14 includes physical memory and the control circuitry used to pass information into and out of the physical memory to other circuits of conventional electronic computing device 2. Memory 14 may optionally also include other circuits that are accessed using a memory-style interface. The physical memory of memory 14 may be volatile memory or non-volatile memory. The memory 14 illustrated in FIG. 1 includes random access memory (RAM) 14a, flash memory 14b, and optional other circuits 14c coupled via a memory-style interface. Each type of memory, RAM 14a, flash memory 14b, and optional other circuitry 14c, is accessible within the conventional electronic computing device 2. As represented by the dashed lines, each type of memory may also have a portion that is external to the conventional electronic computing device 2.

Memory 14 and other circuits of the conventional electronic computing device 2 are accessible according to a memory map 16. Within the memory map 16, a firmware portion 16a is arranged to store computing instructions executable by the processor 12, and a data portion 16b is arranged to store data associated with the conventional electronic computing device 2. Various ones of the computing instructions stored in the firmware portion 16a are accessed via reference to a known start address of the firmware (i.e., SA_FIRMWARE). Various elements of data stored in the data portion 16b are accessed via reference to a known or determinable start address of the data section (i.e., SA_DATA).

The conventional electronic computing device 2 of FIG. 1 includes I/O circuitry 18, which is used to pass information into and out of the conventional electronic computing device 2. An optional wired transceiver 18a and an optional wireless transceiver 18b cooperate with the I/O circuitry 18. In some cases, a remote computing server 20 is arranged to pass information through a computing network 22 to the conventional electronic computing device 2 via one or both of the wired transceiver 18a and the wireless transceiver 18b.

For example, in some cases, it is determined that firmware (or other software) of the conventional electronic computing device 2 will be updated. In this case, since dozens, hundreds, thousands, or more conventional electronic computing devices 2 are in operation, the remote computing server 20 will identify and send updated firmware to each of the conventional electronic computing devices 2. The firmware will be passed in a wired or wireless manner via computing network 22 communicatively coupled to I/O circuitry 18. The processor 12 will execute computing instructions to store the updated firmware in memory 14.

Further considering the concurrent firmware update to a plurality of conventional electronic computing devices 2, when each device receives the firmware, then each conventional electronic computing device 2 will update itself in a same or similar manner. That is, the updated firmware will be stored in the memory 14 at a location SA_FIRMWARE of the firmware portion 16a indicated in the memory map 16. Each one of the conventional electronic computing devices 2 will perform and store the firmware in this same identical way.

In some cases, the memory map 16 indicates two different SA_FIRMWARE addresses within the firmware portion 16a. These cases may be used, for example, so that firmware operating from one set of addresses can store updated firmware in another set of addresses. Once the update is completed, each re-boot of the conventional electronic computing device 2 will operate by executing computing instructions from the second SA_FIRMWARE address where the updated firmware was stored. If further firmware updates are required, then the subsequent firmware may be stored in a ping-pong fashion at either the original SA_FIRMWARE address or the second SA_FIRMWARE address.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

BRIEF SUMMARY

When a plurality of same devices each stores firmware or other particular information in a same way, and at a same location in memory, a malicious hacker can learn how to attack one device, and in this way also learn how to attack each and every one of that type of device. This is a significant drawback of conventional electronic devices. To overcome this drawback, it has been discovered by the inventors that if each one of the same type of device stores the firmware or other particular information in memory at a different offset, then the work of a malicious hacker will require separate attention to each and every device.

The present disclosure therefore improves the functioning of some embodiments of embedded mobile devices with systems and methods that securely provide a new firmware image to the device in a way that reduces the attack surface. The new firmware image is bound to a single device to prevent cloning. In at least some cases, a combination of a random number, generated by a random number generator, and an encryption key creates a unique offset position in a flash memory for the storage of the firmware. Copying or cloning the flash memory will not yield functional firmware if the offset is not known by the copier. Because the location in memory where the image is going to be executed from is not known a priori, the location is instead randomized for each new firmware version. This type of solution reduces the attack surface because it provides insufficient information to an attacker regarding where to locate the firmware.

A firmware update method may be summarized as including: receiving a firmware image at an electronic device, the electronic device having a processor and a memory arranged to store instructions executed by the processor; retrieving a unique device identifier; generating a random number; securely storing the generated random number; computationally combining the random number and a representation of the unique device identifier to create a device-binding value; generating an address-offset from the device-binding value; and storing the firmware image in the memory at the address-offset.

The firmware update method may further include: mapping a plurality of firmware functions in a vector table based on the address-offset; interrupting the processor; retrieving an interrupt vector from the vector table; and executing instructions retrieved from the memory based on the interrupt vector.

The firmware image may be received at the electronic device wirelessly.

The firmware update method may further include encrypting the unique device identifier to generate the representation of the unique device identifier.

Encrypting the unique device identifier may include executing an encryption function from a secure element, the secure element separate from the memory arranged to store instructions executed by the processor. Generating the random number may include executing a random number generation function from a secure element, the secure element separate from the memory arranged to store instructions executed by the processor. Securely storing the generated random number may include securely storing the generated random number in a secure element, the secure element separate from the memory arranged to store instructions executed by the processor. Computationally combining the random number and the representation of the unique device identifier to create the device-binding value may include accepting the random number and the representation of the unique device identifier as inputs to a logic function, the device-binding value produced as an output of the logic function. The logic function may include an exclusive-OR logic function. Generating the address-offset from the device-binding value may include isolating a determined number of bits of the device-binding value.

The firmware update method may further include: identifying a first address in the memory; and storing obfuscation data in the memory between the first address and the address-offset.

The firmware update method may further include: booting the electronic device; retrieving the unique device identifier; retrieving the generated random number; computationally combining the random number and the representation of the unique device identifier to create the device-binding value; generating the address-offset from the device-binding value; and executing with the processor instructions retrieved from the memory at address locations based on the address-offset.

A portable computing device may be summarized as including: a processor; a memory arranged to store instructions executed by the processor; and a boot-loader logic, the boot-loader logic including boot-loader instructions executable by the processor to: retrieve a unique device identifier; generate a random number; securely store the generated random number; computationally combine the random number and a representation of the unique device identifier to create a device-binding value; and generate an address-offset from the device-binding value.

The boot-loader logic may include a hardware-based encryption module and a hardware-based true random number generator.

The portable computing device may further include: a secure element, the secure element including secure memory to store the generated random number; and encryption logic, the encryption logic arranged to generate the representation of the unique device identifier.

The portable computing device may be a mobile phone device, an Internet-of-Things (IoT) device, or a wearable computing device.

A non-transitory computer-readable storage medium whose stored contents configure a computing system to perform a boot-loader method, the boot-loader method may be summarized as including: generating a random number; securely storing the generated random number in a first memory; creating a device-binding value by computationally combining the generated random number with a value that uniquely represents a portable device; generating an address-offset from the device-binding value; and storing information in a second memory based on the address-offset.

The information stored in the second memory may be firmware arranged to direct operations of the portable device. The first memory may be a secure element separate and distinct from the second memory.

The boot-loader method may further include: retrieving a unique device identifier; and encrypting the unique device identifier to generate the value that uniquely represents the portable device.

These features, along with other objects and advantages which will become subsequently apparent, reside in the details of construction and operation as more fully described hereafter and claimed, reference being had to the accompanying drawings forming a part hereof.

This Brief Summary has been provided to introduce certain concepts in a simplified form that are further described in detail below in the Detailed Description. Except where otherwise expressly stated, the Brief Summary does not identify key or essential features of the claimed subject matter, nor is it intended to limit the scope of the claimed subject matter.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

DETAILED DESCRIPTION

The present invention may be understood more readily by reference to this detailed description of the invention. The terminology used herein is for the purpose of describing specific embodiments only and is not limiting to the claims unless a court or accepted body of competent jurisdiction determines that such terminology is limiting. Unless specifically defined herein, the terminology used herein is to be given its traditional meaning as known in the relevant art.

An embodiment of the present invention includes a particularly arranged microcontroller (MCU) in an electronic computing device. One way that a hacker attempts to attack this type of device is to learn where instructions and data are stored in memory that is associated with the MCU. If the hacker learns this information, the hacker may attempt to install malicious software instructions or the hacker may attempt to install malicious data or retrieve secret data on a large number of electronic devices. If the hacker knows a physical memory address to attack, the hacker can attack a plurality of devices by installing or retrieving information from the same physical address.

In the present embodiment, the hacker's attempts are thwarted because software instructions and important data can be stored in memory based on an offset that is unique to each different electronic device. In addition, or in the alternative, a new and different unique offset may be created for each new version of the firmware, and along these lines, the movement of data (i.e., the creation of one or more new and different unique offsets) can be triggered by any event, and not only by a firmware update. The offset can be determined using criteria that is specific to each device such as a unique device identifier and a random number that is locally generated. Once created, the offset will be secured within the device and the offset can be reproduced at any time.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and server computing systems, as well as networks have not been shown or described in detail to avoid unnecessarily obscuring descriptions of the embodiments.

Figure 1:
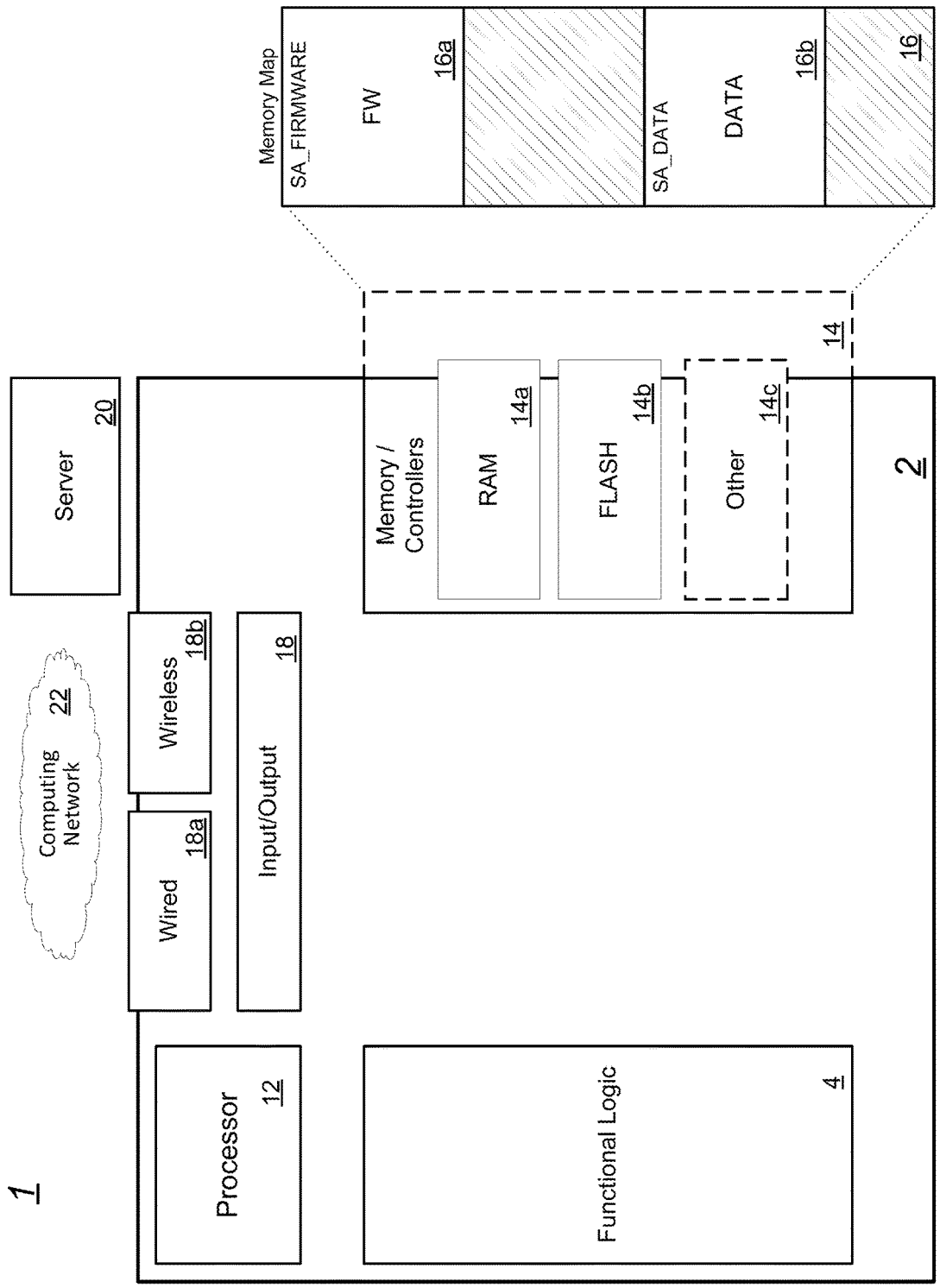
FIG. 1 is an operations model of a conventional electronic computing device.
Figure 2:
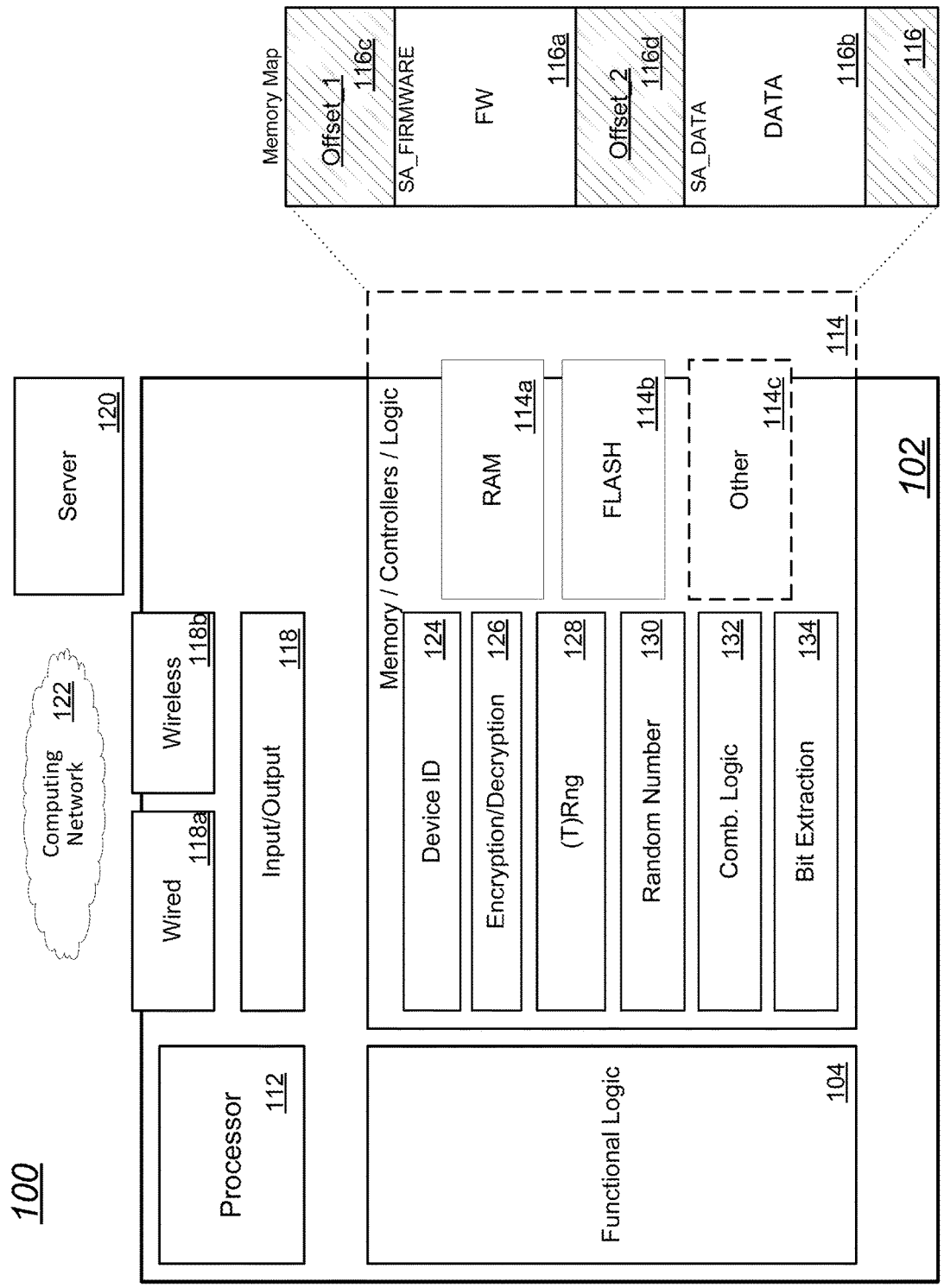
FIG. 2 is an operations model of an electronic computing device embodiment.

FIG. 2 is an operations model 100 of an electronic computing device 102 embodiment. The electronic computing device 102 includes functional logic 104, a processor 112, and memory logic 114. The electronic computing device 102 embodiment also includes input/output (I/O) circuitry 118 and one or more I/O interfaces, such as a wired interface 118a and a wireless interface 118b.

Processor 112 is arranged for communications with memory logic 114. Memory logic 114 includes physical memory and the control circuitry used to pass information into and out of the physical memory to other circuits of the electronic computing device 102. Memory logic 114 includes any one or more of: volatile memory, such as random access memory (RAM) 114a; non-volatile memory, such as flash memory 114b; and optional other circuitry 114c, which may include other volatile and non-volatile memory and peripheral devices having a memory-style interface. As represented by the dashed lines, each of the types of memory and other logic may also have a portion that is external to the electronic computing device 102.

One or more logic sub-modules are arranged in memory logic 114. The logic sub-modules may include data, software, firmware, electronic circuitry, or any combination thereof. In at least one exemplary embodiment, memory logic 114 is arranged to store or otherwise include a device identifier of the specific electronic computing device module 124, an encryption/decryption logic module 126, a random number generator module 128, a random number storage repository 130, a computational combinatorial logic 132, and bit extraction logic 134.

The electronic computing device 102 includes functional logic 104 to fulfill the purpose of the device. For example, if the conventional electronic computing device 102 is a pedometer, the functional logic 104 may include a multi-dimensional motion sensor and corresponding circuitry arranged to count a user's steps. If the device is a utility meter (e.g., gas meter, electricity meter, water meter, or the like), the functional logic 104 may include flow sensors, security circuits, communication logic, and the like. If the conventional electronic computing device 102 is a mobile communications device (e.g., a smart wearable, a smartphone, a tablet, or the like), the functional logic 104 may include power circuitry, security logic, user interface logic (e.g., display logic, touchscreen logic, audio logic, tactile logic, and the like), navigation circuitry, industrial control circuitry, automotive control and data collection logic, and any other such logic.

The functional logic 104 may also include any other functional logic generally found in an electronic computing device 102, and such logic is not expressly identified so as to not obscure other logic that is discussed in the present disclosure. For example, the functional logic 104 may include administrative circuits, interrupt processing circuitry, direct memory access (DMA) circuitry, and optionally other circuits as well. The administrative circuitry may include any number of logic modules, and such logic may be arranged to include or otherwise manage clocks, oscillators, timers, power modes, an audio interface, analog/digital features (e.g., an analog-to-digital controller (ADC); a digital-to-analog controller (DAC)), communication interfaces, debug interfaces, and the like. Interrupt processing circuitry processes planned and unplanned interruptions to the normal operations of the processor 112, which may be synchronous or asynchronous to a system clock. Examples of planned interruptions include expiring timers, certain I/O control circuit inputs (e.g., keypresses, serial or parallel incoming data, and the like). Examples of unplanned interrupts include imminent-loss-of-power interrupts, resets, error traps, watchdog timeouts, and the like. And DMA circuitry operates to copy data from one memory or peripheral location to another memory or peripheral location. Other functional logic is also contemplated.

The memory logic 114 and other circuits of the electronic computing device 102 are accessible according to a memory map 116. Within the memory map 116, a firmware portion 116a is arranged to store computing instructions executable by the processor 112, and a data portion 116b is arranged to store data associated with the electronic computing device 102. Various ones of the computing instructions stored in the firmware portion 116a are accessed via reference to a known start address of the firmware (i.e., SA_FIRMWARE). Various elements of data stored in the data portion 116b are accessed via reference to a known or determinable start address of the data section (i.e., SA_DATA).

The SA_FIRMWARE start address of the firmware portion 116a in the embodiment of FIG. 2 is set off from a first point in the memory space by a first offset 116c, identified in FIG. 2 as Offset_1. The first point in the memory space defined by Offset_1 may be the first address in the memory space, a first address in a particular volatile or non-volatile memory, or some other known address in the memory space.

The SA_DATA start address of the data portion 116b in the embodiment of FIG. 2 is set off from a second point in the memory space by a second offset 116d, identified in FIG. 2 as Offset_2. The second point in the memory space may be the first address in the memory space, a first address in a particular volatile or non-volatile memory, or some other known address in the memory space.

The memory space preceding the firmware portion 116a, and the memory space preceding the data portion 116b may occupy a portion of memory of any size. For example, the size of the first offset 116c portion and the size of the second offset 116d portion may be one byte, two bytes, four bytes, or any other number of bytes. The size of the first offset 116c portion and the size of the second offset 116d portion may be the same or the sizes may be different.

For each physical instance of an electronic computing device 102, the first offset 116c is generated for that particular device. In this way, the size of the first offset 116c for one electronic computing device 102 may be different than the size of the first offset 116c for any other electronic computing device 102, even though the devices are manufactured to be "the same." Along these lines, when a second offset 116d is implemented, the second offset 116d is expressly generated for that particular device, and the size of the second offset 116d for one electronic computing device 102 may be different than the size of the second offset 116d for any other electronic computing device 102.

By expressly generating an offset to a defined area of the memory space (e.g., such as the firmware storage area 116a and the data storage area 116b) for each physical electronic computing device 102, then a malicious operation to discover the location of the defined area of the memory space must be conducted one-at-at-time, for each different electronic computing device 102, and information learned about a start address (e.g., SA_FIRMWARE or SA_DATA) in one device is not useful for any other device.

The I/O circuitry 118, 118a, 118b of electronic computing device 102 is used to pass information into and from the device. In some cases, a remote computing server 120 is arranged to pass information through a computing network 122 to and from the electronic computing device 102 via one or both of the wired transceiver 118a and the wireless transceiver 118b.

For example, in some cases, it is determined that firmware or other software of the electronic computing device 102 will be updated. Since dozens, hundreds, thousands, or more of this particular type of electronic computing device 102 are in operation, the remote computing server 120 will identify and send updated firmware to each of the electronic computing devices 102. The firmware is passed in a wired or wireless manner via computing network 122 communicatively coupled to I/O circuitry 118. Processor 112 executes computing instructions to store the updated firmware, other software, or data, as the case may be, at a determined address defined in memory logic 114.

Further considering the concurrent update of information (e.g., firmware, software, data, or the like) to a plurality of electronic computing devices 102, when each device receives the information, then each electronic computing device 102 will update itself by generating its own first offset 116c, second offset 116d, or other offset, as the case may be. In this way, for example, updated firmware will be stored in the memory logic 114 at a location SA_FIRMWARE that is different for each different device, update data will be stored in the memory logic 114 at a location SA_DATA that is different for each different device, and so on.

Even in cases where the memory map 116 indicates two different SA_FIRMWARE addresses within the firmware portion 116a (i.e., for updating firmware in a conventional "ping-pong" fashion), the two different SA_FIRMWARE addresses of one device will not be the same as the two different SA_FIRMWARE addresses of each other device. The reason that all of these addresses are different is that each separate device generates its own offset values.

Figure 3:
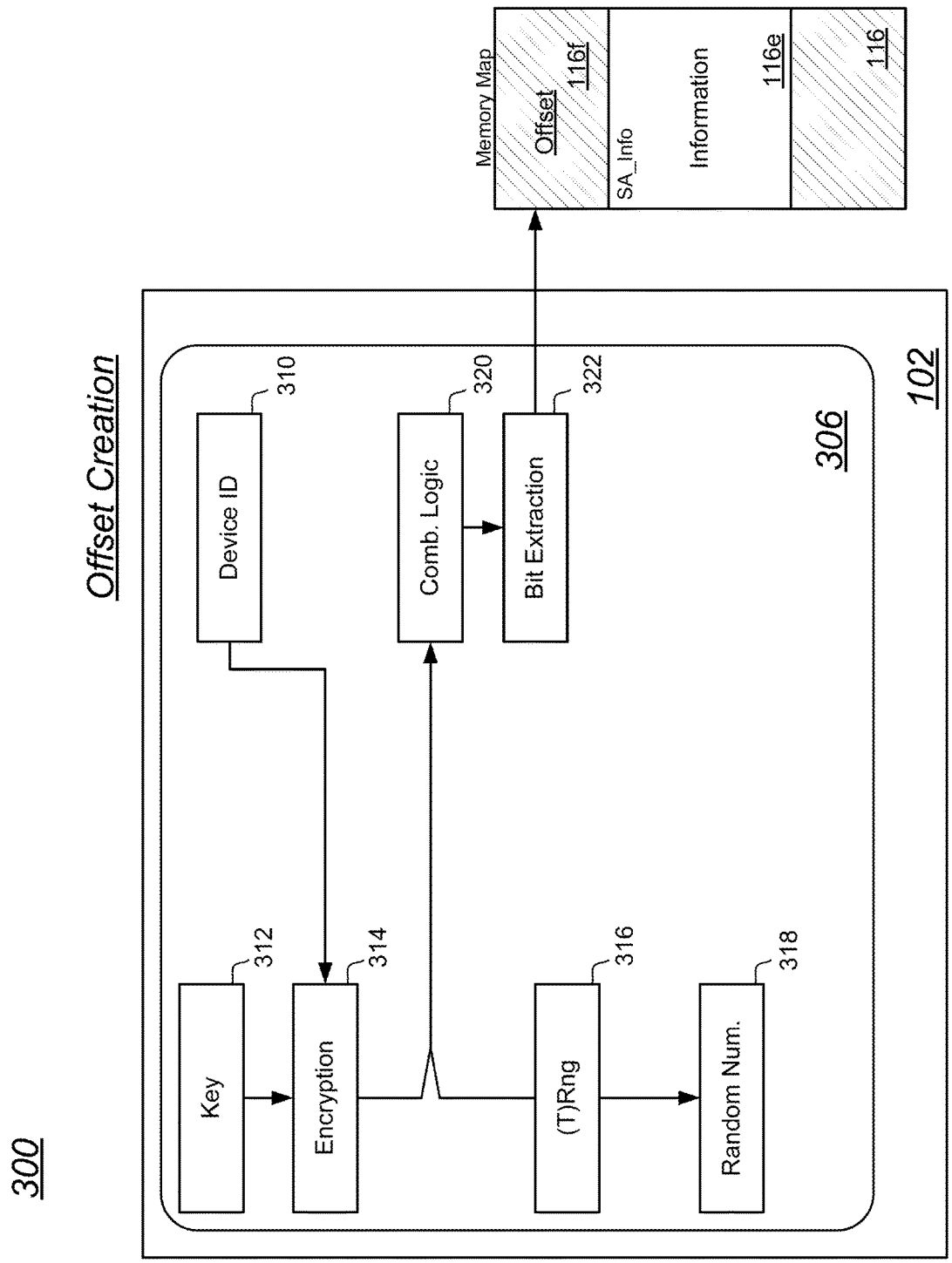
FIG. 3 is a first block diagram and data flow embodiment illustrating creation of an offset.

FIG. 3 is a first block diagram and data flow embodiment 300 illustrating creation of an offset. The first block diagram and data flow embodiment 300 is arranged to implement an electronic computing device embodiment 102 along the lines of the device in FIG. 2. The MCU 306 includes device identifier logic 310, encryption key logic 312, encryption algorithm logic 314, random number generator logic 316, secure storage logic 318, combinatorial logic 320, and bit extraction logic 322. A memory map 116 associated with the first block diagram and data flow embodiment 300 defines an information area 116e having a starting address SA_Info. The information area 116e may be formed at a third offset area 116f.

The electronic computing device embodiment 102 of FIG. 3 may be arranged as a microcontroller (MCU) 306 that implements a utility meter, an industrial device, a smartphone, a wearable, a vehicle computing device, or some other computing device. For example, if the electronic computing device embodiment 102 of FIG. 3 is arranged as a gas meter, firmware in the gas meter may be arranged to calibrate and operate valves, sensors, and other electronic circuits and electromechanical structures to measure the quantity of gas that passes from a supply line, through the gas meter, to a consumer's facility where the gas is consumed. In this case, the Information area 116e may be arranged to store firmware at a particular third offset 116f from a start of memory logic 114. In addition, or in the alternative, the information area 116e may be arranged to store data that represents a quantity of gas that passes through the gas meter, and this "quantity used" data may be stored at the particular third offset 116f from a known address in memory logic 114. In this exemplary case, there may be thousands of identical gas meters installed. If each individual gas meter generates its own third offset 116f, then the firmware, data, or other information of each gas meter will be stored in an information area 116e that is located at a physical address that has been customized for that particular gas meter.

An exemplary method of operation of the first MCU 306 embodiment is now described. One or more acts of the method now described may occur in a different order than now presented without changing the principle of operation, and one or more acts of the method may optionally be performed or omitted. The exemplary method generates an offset (i.e., third offset 116f), which may be used to store firmware, data, or some other information in an information area 116e.

In a first act, random number generator logic 316 is engaged to generate a random number. The random number generator logic 316 may be a true random number generator, a seeded random number generator, or some other random number generator means that is determined to generate random numbers having a sufficient level of randomness. The generated random number is sufficiently unique as to distinguish one gas meter from each of the other dozens, hundreds, or thousands of other gas meters.

In a second act, the random number generated in the first act is stored via secure storage logic 318. The secure storage logic may be a secure flash memory such as a subscriber identity module (SIM) card, an embedded flash device arranged as part of MCU 306 that is physically inaccessible outside of the MCU 306, or some other protected storage means. In some cases, the generated random number is encrypted or otherwise obfuscated prior to storage via secure storage logic 318.

In a third act, a unique identifier is retrieved via the device identifier logic 310. The unique identifier is unique amongst any other electronic computing device 102 that may operate in a system of electronic computing devices 102 or amongst any other devices that need to be otherwise distinguished. In some cases, the unique identifier may be an International Mobile Equipment Identity (IMEI), a universally unique identifier (UUID), a hard drive serial number, a media access control (MAC) address, a manufacturer's proprietary identifier, or any other determined identifier. In at least one case, the unique identifier is a 96-bit physical hardware identifier encoded into each different electronic computing device 102.

Once the unique identifier is retrieved in the third act, the unique identifier may optionally be encrypted for further security. This act may be performed, for example, when the unique identifier is also used for other purposes and may therefore be known or discovered outside of the electronic computing device 102. In cases where the unique identifier is encrypted, any desirable symmetric, asymmetric, or other encryption algorithm may be used. For example, encryption may be performed according to an advanced encryption standard (AES) algorithm, a date encryption standard (DES) or triple DES (3DES) algorithm, a Rivest-Shamir-Adleman (RSA) algorithm, a wired equivalent privacy (WEP) algorithm, a Wi-Fi protected access (WPA) or Wi-Fi protected access II (WPA2) algorithm, a temporal key integrity protocol (TKIP) algorithm, a counter mode with cipher block chaining message authentication code protocol (CCMP) algorithm, or any some other type of encryption algorithm means. In some cases, the encryption is enabled with a particular public or private key that is optionally provided by encryption key logic 312. In at least one case, the encryption logic 314 performs and AES algorithm to generate an encrypted value representation of a unique device identifier.

In a fourth act, combinatorial logic 320 is arranged to hash the encrypted value from the encryption logic 314 with the random number generated by the random number generator logic 316 to create a particular device-binding value. The combinatorial logic 314 may be, for example, an exclusive-OR (XOR) hash function. Alternatively, another type of hash function means may be employed. Exemplary and non-limiting hash functions include any type of cyclic redundancy checks, checksums, tabulations, fingerprints, rotations, divisions, multiplications, and the like.

In a fifth act, the device-binding value created in the fourth act is normalized using bit extraction logic 322. The bit extraction logic 322 may be arranged to isolate a determined number of bits of the device-binding value that will be used for the third offset 116f. Any means can be used to perform the isolation of bits to create the third offset 116f. For example, a modulo algorithm may be employed to create the bits used as the third offset 116f. Alternatively, or in addition, a fixed number of bits, a modifiable number of bits, a user-determined number of bits, or some other number of bits of the hashed output value are isolated. These N bits are used to create the third offset 116f.

In a further example, the exemplary method of operation of the first MCU 306 embodiment that was described by way of a first act, a second act, a third act, a fourth act, and a fifth act is now described. This further example is non-limiting and one of skill in the art will recognize that the principles and techniques described herein can easily be adapted to other implementations of where information such as firmware and data is stored at different physical addresses in memories of otherwise identical electronic computing devices 102.

In this further example, a firmware image is received at an electronic computing device 102 of the type illustrated in FIG. 3. The firmware image may be received via a wired medium, a wireless medium, or some combination thereof. For example, a central authority computing server 120 (FIG. 2) may wirelessly pass the same firmware image to a plurality of electronic computing devices 102 via computing network 122.

When each electronic computing device 102 partially or wholly receives the firmware image (e.g., to execute the process more efficiently, the process may begin before some or all of the firmware image is received at the electronic computing device 102), the particular device will retrieve a unique device identifier. The electronic computing device 102 will generate and store a random number, and the device will computationally combine the random number and a representation of the unique device identifier to create a device-binding value. From the device-binding value, which is unique to each electronic computing device 102, certain bits will be extracted to generate an address offset.

Once the address offset is generated, the received firmware is then stored in memory at a physical address determined at least in part according to the address offset. For example, in some cases, a plurality of firmware functions are mapped in a vector table that is based on the generated address offset. In this way, when the processor of the electronic computing device 102 is interrupted, an interrupt vector is retrieved from the vector table, and instructions retrieved from memory based on the interrupt vector are executed. As evident in the example, the same firmware is communicated to a plurality of different electronic computing devices 102, but the firmware image is stored in a non-volatile way at a different physical address in memory logic 114 based on the generated address offset. While it is possible that two or more of the electronic computing devices 102 will create the same offset, a hacker will not know this because the means to generate the offset in any particular device is based on information that is unique (e.g., one or more of a unique device identifier, a locally generated random number, or some other like unique information) to that particular device.

In some cases, once the address offset (i.e., third offset 116f) is determined, memory associated with the address offset may be zeroed, filled with a known value, randomized, or obfuscated in a desirable way. With reference to FIG. 3, for example, the offset area identified with the third offset 116f from a beginning of memory to the address SA_Info determined by the third offset 116f is blanked, filled, or appropriately obfuscated.

Figure 4:
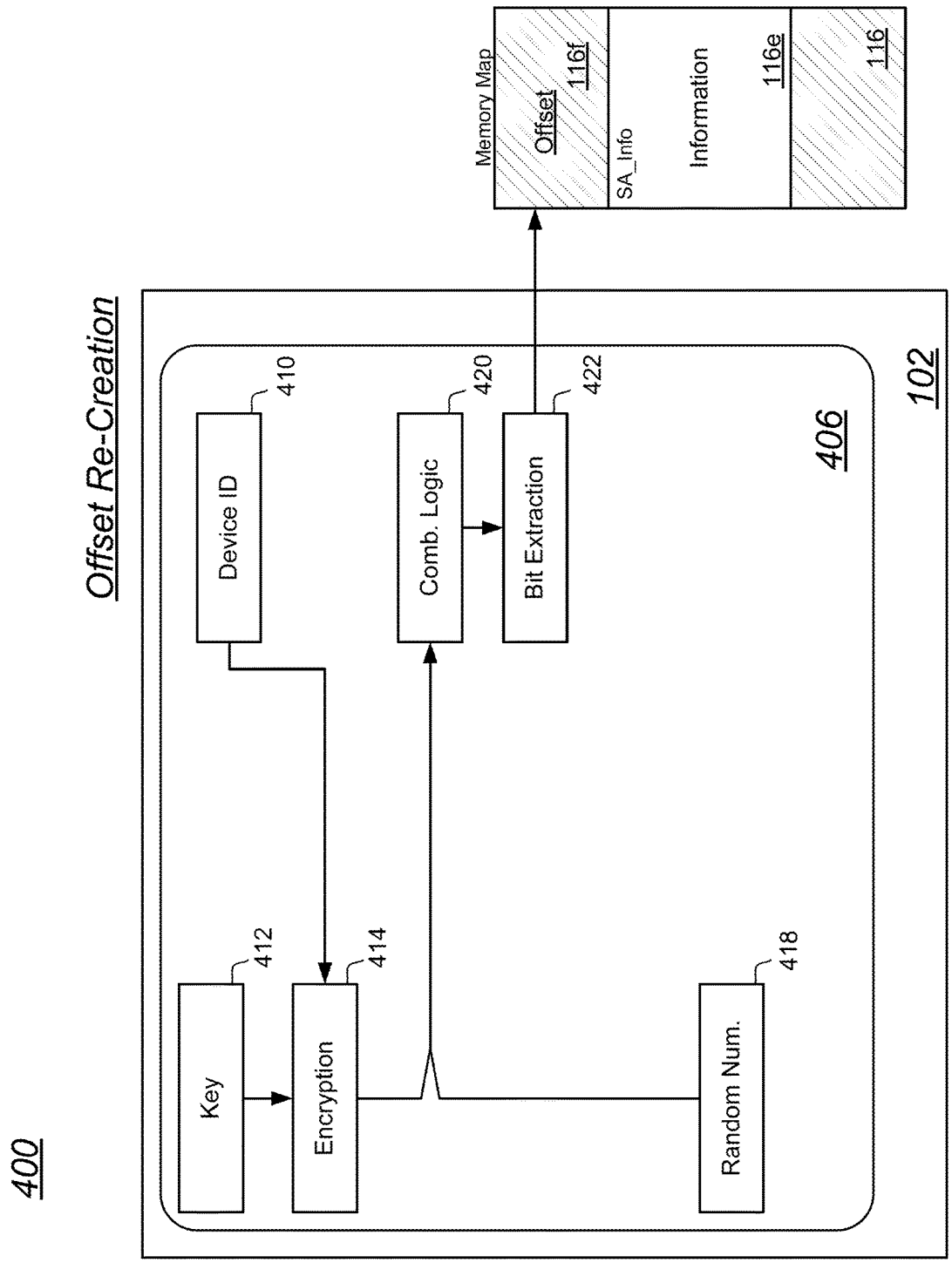
FIG. 4 is another perspective of the first block diagram and data flow embodiment of FIG. 3 illustrating re-creation of the offset.

FIG. 4 is another perspective 400 of the first block diagram and data flow embodiment 300 of FIG. 3 illustrating re-creation of the offset. In the discussion of FIG. 3, an example was provided wherein a firmware image was delivered to an electronic computing device 102, the device generated the third offset 116f, and the device stored the firmware image in non-volatile memory beginning at a physical address based on the third offset 116f. It is understood that when a processor 112 re-boots, the processor will often be predisposed to begin execution of instructions that are stored at a particular physical address. For this reason, it is recognized that upon a re-boot of the electronic computing device 102, and at other times, it may be necessary to re-create that third offset 116f. The perspective 400 of FIG. 4 illustrates at least one means of re-creating the third offset 116f.

In the perspective 400 of FIG. 4, an MCU 406 includes device identifier logic 410, encryption key logic 412, encryption algorithm logic 414, secure storage logic 418, combinatorial logic 420, and bit extraction logic 422. To one of skill in the art, the logic of MCU 406 can be clearly associated with corresponding logic of MCU 306 (FIG. 3). For example, the device identifier logic 410 is arranged to retrieve the same unique identifier as the device identifier logic 310 of FIG. 3, the encryption key logic 412 is arranged to retrieve the same key value as the encryption key logic 312 of FIG. 3, and so on. In FIG. 4, memory map 116 associated with the MCU 306 (FIG. 3) and MCU 406 defines the information area 116e having a starting address SA_Info, formed at the third offset area 116f.

An exemplary method of operation of MCU 406 is now described. One or more acts of the method may occur in a different order than now presented without changing the principle of operation, and one or more acts of the method may optionally be performed or omitted. The exemplary method of MCU 406 generates (i.e., re-creates) the same offset (i.e., third offset 116f) generated by MCU 306, which may be used to store firmware, data, or some other information in information area 116e.

In a first act of FIG. 4, the random number generated by MCU 306 and stored via secure storage logic 318 of MCU 306 is retrieved by secure storage logic 418 in MCU 406.

In a second act, the unique identifier of the electronic computing device 102 is retrieved via the device identifier logic 410. Once the unique identifier is retrieved, the unique identifier is optionally encrypted according to a particular encryption algorithm and optionally using a particular public or private key provided by encryption key logic 412. The encryption logic 414 generates a same encrypted value representation of the unique device identifier that was generated by encryption logic 314 (FIG. 3).

In a third act, combinatorial logic 420 is arranged to hash the encrypted value from the encryption logic 414 with the random number retrieved via secure storage logic 418 to re-create the particular device-binding value.

And finally, in a fourth act, the device-binding value created in the third act is normalized using bit extraction logic 422. Normalization includes isolating the same N bits of the device-binding value as were isolated by the bit extraction logic 322 of FIG. 3. This process re-creates the third offset 116f, and upon such re-creation, the electronic computing device 102 may continue its processing according to the functional logic 104 of the particular device.

Figure 5:
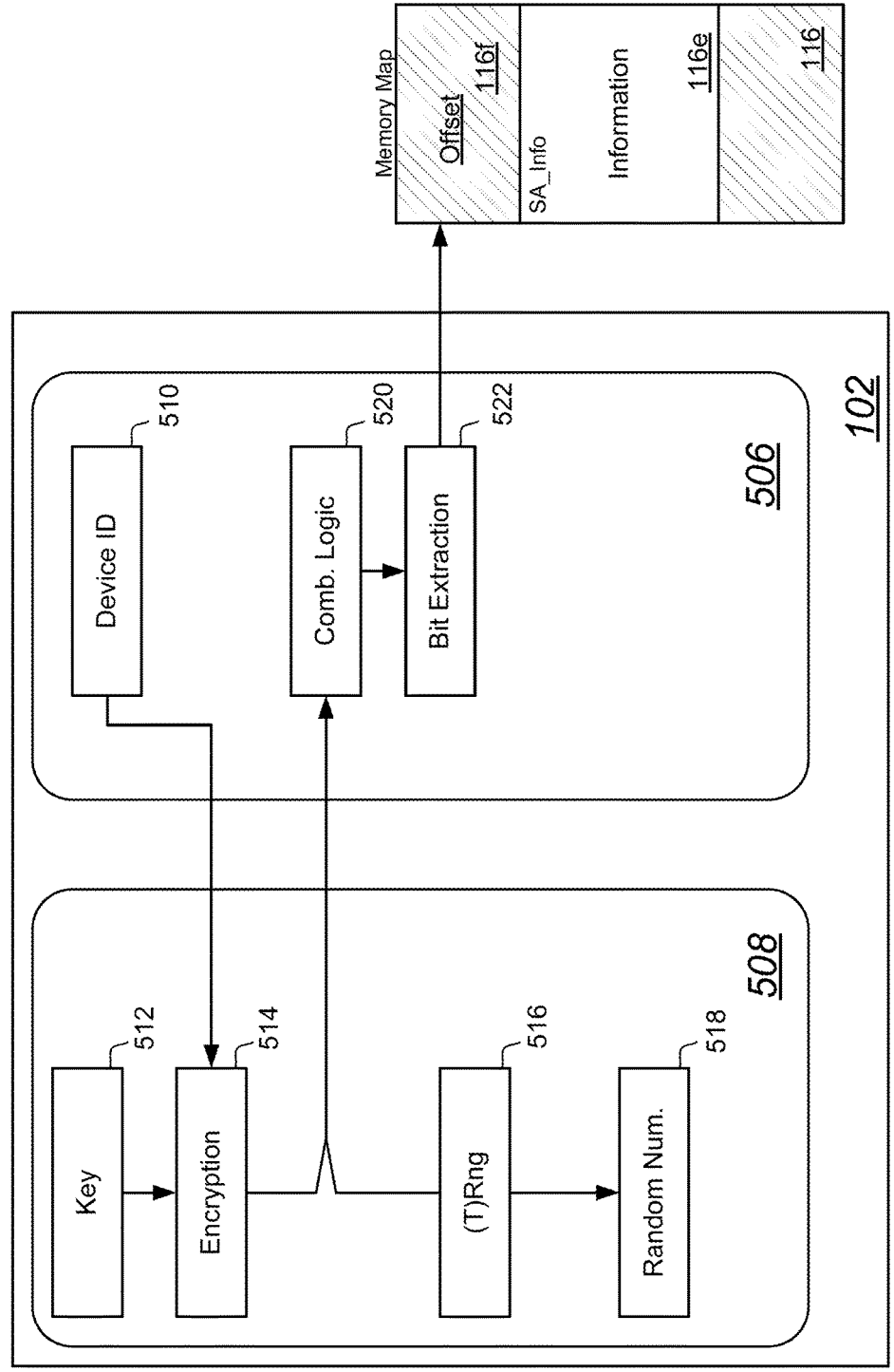
FIG. 5 is a second block diagram and data flow embodiment illustrating creation of an offset.

FIG. 5 is a second block diagram and data flow embodiment 500 illustrating creation of the third offset using a different arrangement of structures in an electronic computing device 102. In the embodiment of FIG. 5, an MCU 506 cooperates with a first secure element 508 embodiment. The operations of the second block diagram and data flow embodiment 500 are along the lines of those represented in FIG. 3, however, particular acts of certain methods are performed from within the first secure element 508. In this way, additional security may be afforded to the particular electronic computing device 102.

As illustrated in the embodiment of FIG. 5, the MCU 506 includes software, hardware, or a combination of software and hardware arranged to provide device identifier logic 510, combinatorial logic 520, and bit extraction logic 522. These logic elements may correspond to the device identifier logic 310, combinatorial logic 320, and bit extraction logic 322 of FIG. 3. Along these lines, the first secure element 508 includes software, hardware, or a combination of software and hardware arranged to provide encryption key logic 512, encryption logic 514, random number generator logic 516, and secure storage logic 518, which are along the lines of encryption key logic 312, encryption logic 314, random number generator logic 316, and secure storage logic 318 of FIG. 3.

An exemplary method of operation of the electronic computing device 102 of FIG. 5 is along the lines of the exemplary method of operation of the first MCU 306 embodiment described with respect to FIG. 3.

Figure 6:
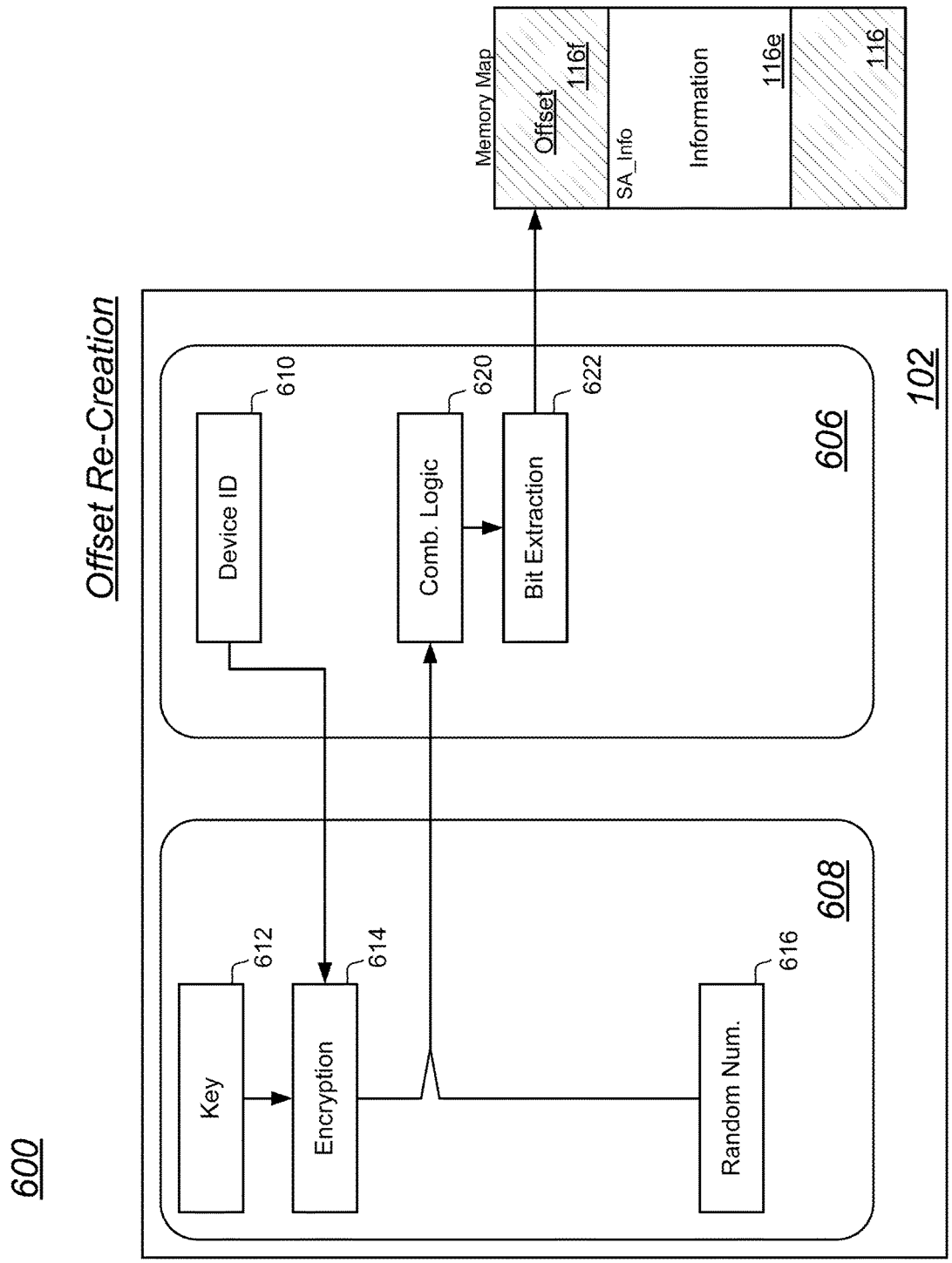
FIG. 6 is another perspective of the second block diagram and data flow embodiment of FIG. 5 illustrating re-creation of the offset.

FIG. 6 is another perspective 600 of the second block diagram and data flow embodiment 500 of FIG. 5. The perspective 600 of FIG. 6 illustrates re-creation of the third offset 116f using an MCU 606 and a secure element 608, whose structures correspond to the MCU 506 and first secure element 508 presented in FIG. 5. Along these lines, one of skill in the art will recognize that the exemplary method presented in view of MCU 406 of FIG. 4 may be correspondingly presented in view of MCU 606 and secure element 608 of FIG. 6.

Figure 7:
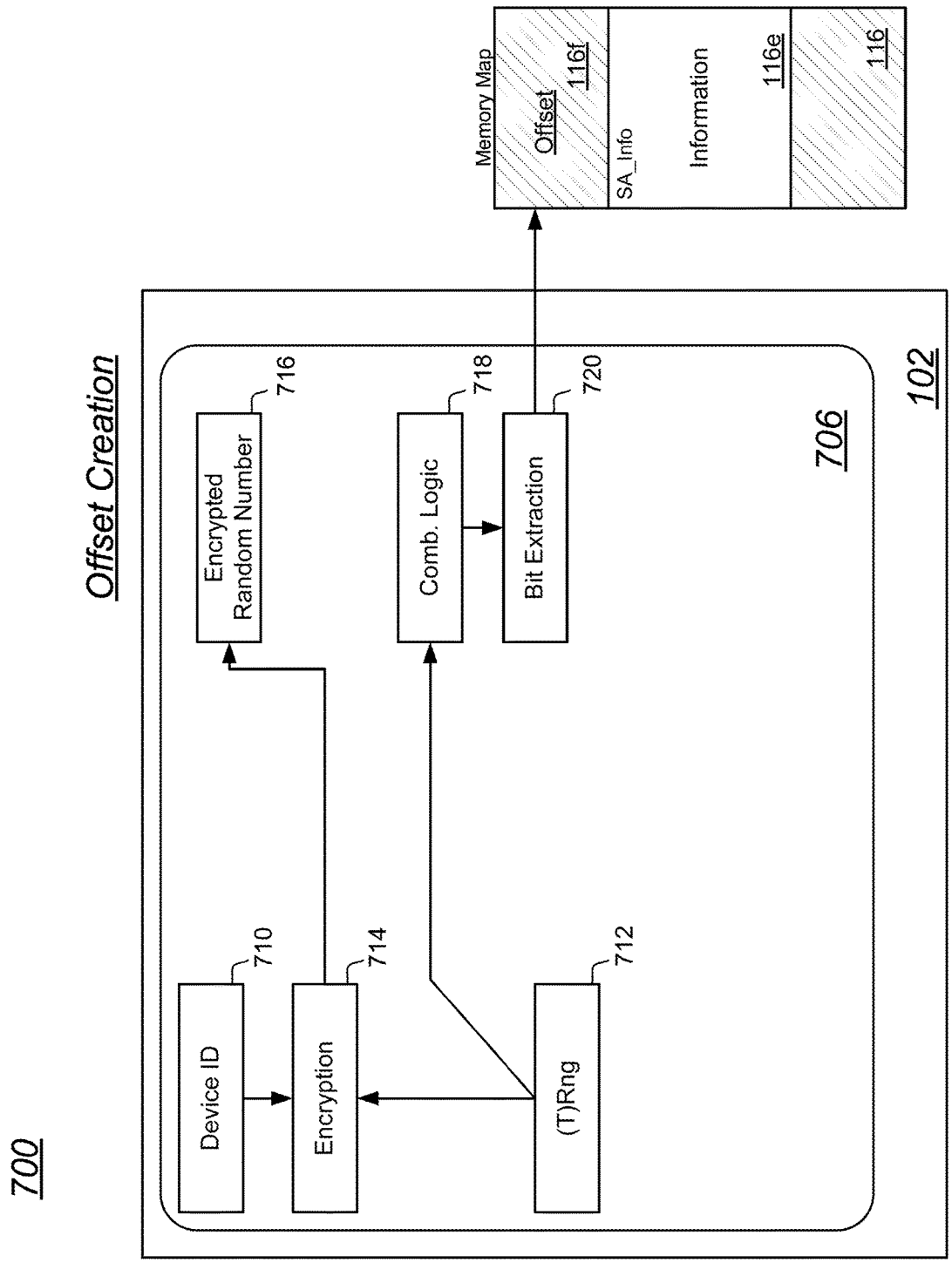
FIG. 7 is a third block diagram and data flow embodiment illustrating creation of an offset.

FIG. 7 is a third block diagram and data flow embodiment 700 illustrating yet another structural arrangement to create the third offset 116f.

Figure 8:
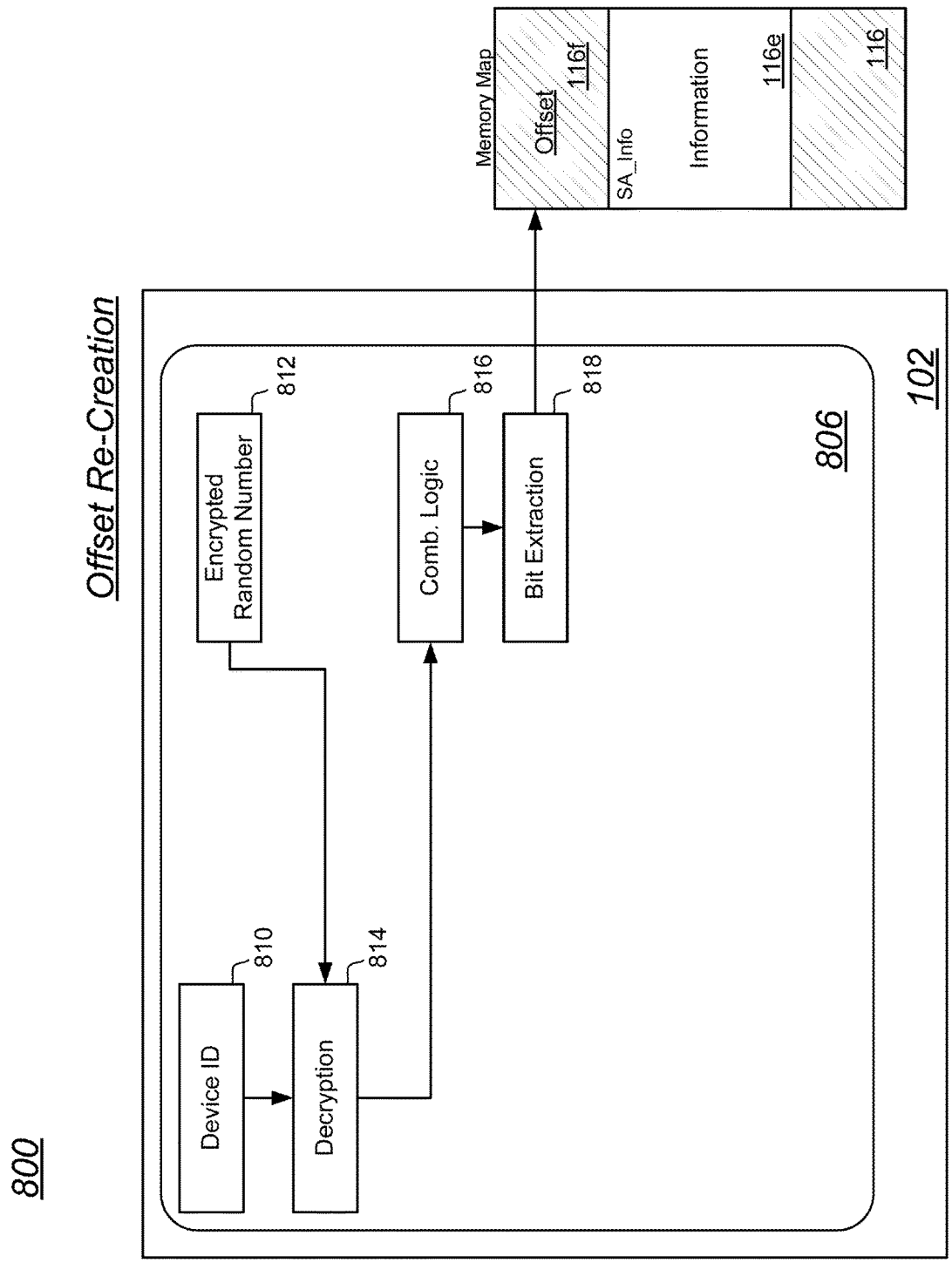
FIG. 8 is another perspective of the third block diagram and data flow embodiment of FIG. 7 illustrating re-creation of the offset.

FIG. 8 is another perspective 800 of the third block diagram and data flow embodiment 700 of FIG. 7 illustrating re-creation of the third offset 116f using structures like those presented in FIG. 7.

In FIG. 7, an MCU 706 is arranged with device identifier logic 710, random number generator logic 712, encryption logic 714, secure storage logic 716, combinatorial logic 718, and bit extraction logic 720. The logic modules of FIG. 7 may respectively correspond to like logic structures of FIG. 3.

It has been recognized by the present inventors that operation of certain random number generation logic, such as a true random number generator, may be computationally expensive, time consuming, and a consumer of significant power resources. For this reason, in some cases, such as when the electronic computing device 102 is a battery-powered device, it is desirable to limit use of the random number generator logic 712. A non-limiting and exemplary method of operation of the MCU 706 is now described.

In a first act of the exemplary method, the random number generator logic 712 generates a random number. The generated random number is presented to encryption logic 714 and concurrently presented to combinatorial logic 718.

In a second act, a unique device identifier of the type described herein is also provided to encryption logic 714, and the encryption logic 714 encrypts the generated random number in accordance with the provided unique device identifier, which is used as a key. The encrypted value is stored via the secure storage logic 716.

In a third act, the combinatorial logic 718 computationally combines or otherwise hashes the generated random number to produce the device-binding value.

And in a fifth act, a determined number of N bits of the device-binding value are isolated and used to produce the third offset 116f.

To avoid unnecessarily clouding the structures and operations of the MCU 706, various configurations and arrangements of the structures and operations have been expressed without significant detail. One of skill in the art will recognize that particular details disclosed with respect to FIGS. 2-6 may also be suitably applied to the structures and operations of MCU 706. Along these lines, one of skill in the art will also recognize that particular details disclosed with respect to FIGS. 2-6 may be suitably applied to the structures and operations of MCU 806 of FIG. 8.

In an exemplary operation of MCU 806 of FIG. 8, the third offset 116f is re-created without any further use of the random number generator logic 712 (FIG. 7). Instead, after a reboot or other reset of the electronic computing device 102, device identifier logic 810 provides the unique device identifier to decryption logic 814. Encryption logic 812, which is arranged to securely store the encrypted random number (FIG. 7), retrieves the encrypted random number and presents the same to decryption logic 814.

After decryption logic 814 reproduces the original random number, the original random number is presented to the combinatorial logic 816 to re-create the device-binding value. Once so generated, the device-binding value is passed to bit-extraction logic 818 to isolate N particular bits and thereby re-create the third offset 116f.

It is recognized herein that each of the terms, "security keys," "secure keys," "cryptographic keys," "decryption keys," and "encryption keys," and the like has different meanings in particular contexts. Because the specific "keys" or types thereof are not directly essential to the inventive subject matter described herein, the term "secure key" in all of its grammatical forms is used interchangeably with any particular secure key of any particular secure key type as the context allows.

As used in the present disclosure, the term "module" may refer to an electronic circuit, a processor and a memory operative to execute one or more software or firmware programs, combinational logic circuitry, or other suitable components (hardware, software, or hardware and software) that provide the functionality described with respect to the module.

FIGS. 3-8 are data flow diagrams illustrating processes or functions that may be used by embodiments of processor 112. In this regard, each described process may represent a module, segment, or portion of code, which comprises one or more executable instructions for implementing the specified logical function(s). It should also be noted that in some implementations, except where an order is expressly stated, the functions noted in the process may occur in a different order, may include additional functions, may occur concurrently, and/or may be omitted.

FIG. 2 illustrates various computing devices such as remote computing server 120 and electronic computing device 102. These computing devices include operative hardware found in a conventional computing apparatus such as one or more central processing units (CPU's), volatile and non-volatile memory, serial and parallel input/output (I/O) circuitry compliant with various standards and protocols, wired and/or wireless networking circuitry, and other conventional structures. As known by one skilled in the art, a computing device has one or more memories, and each memory comprises any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk drive, a flash memory device, a CD-ROM, and/or the like. In some cases, a particular memory is separated virtually or physically into separate areas, such as a first memory, a second memory, a third memory, etc. In these cases, it is understood that the different divisions of memory may be in different devices or embodied in a single memory.

Computing devices may further include operative software found in a conventional computing device such as an operating system, software drivers to direct operations through the I/O circuitry, networking circuitry, and other peripheral component circuitry. In addition, computing devices include operative application software such as network software for communicating with other computing devices, database software for building and maintaining databases, and task management software for distributing the communication and/or operational workload amongst various CPU's. In some cases, the computing devices described in the present disclosure are a single hardware machine having the hardware and software listed herein, and in other cases, the computing servers are a networked collection of hardware and software machines working together in a network such as a server farm to execute at least some of functions described in the present disclosure.

When so arranged as described herein, each computing device described in the present disclosure may be transformed from a generic and unspecific computing device to a combination device comprising hardware and software configured for a specific and particular purpose.

In the foregoing description, certain specific details are set forth to provide a thorough understanding of various disclosed embodiments. However, one skilled in the relevant art will recognize that embodiments may be practiced without one or more of these specific details, or with other methods, components, materials, etc. In other instances, well-known structures associated with electronic and computing systems including client and server computing systems, as well as networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising," are to be construed in an open, inclusive sense, e.g., "including, but not limited to."

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content and context clearly dictates otherwise. It should also be noted that the conjunctive terms, "and" and "or" are generally employed in the broadest sense to include "and/or" unless the content and context clearly dictates inclusivity or exclusivity, as the case may be. In addition, the composition of "and" and "or" when recited herein as "and/or" is intended to encompass an embodiment that includes all of the associated items or ideas and one or more other alternative embodiments that include fewer than all of the associated items or ideas.

The headings and Abstract of the Disclosure provided herein are for convenience only and do not limit or interpret the scope or meaning of the embodiments.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A firmware update method, comprising:
receiving a firmware image at an electronic device, the electronic device having a processor and a memory arranged to store instructions executed by the processor;
retrieving a unique device identifier;
generating a random number;
securely storing the generated random number in a secure element, the secure element being separate from the memory used to store instructions executed by the processor;
computationally combining the random number and a representation of the unique device identifier using a hash function to create a device-binding value, the device-binding value being specific to the device;
generating a firmware address-offset from the device-binding value;
storing the firmware image at a physical address in a non-volatile portion of the memory, wherein the physical address is based on the firmware address-offset;
after updating the firmware, generating a data address-offset, the data address-offset being specific to the device.

2. The method according to claim 1, comprising:
during the firmware update, mapping a plurality of firmware functions in a vector table based on the firmware address-offset;
after updating the firmware, responding to a processor interrupt by:
retrieving an interrupt vector from the vector table;
retrieving instructions from the non-volatile portion of the memory based on the interrupt vector;
executing the retrieved instructions.

3. The method according to claim 1 wherein the firmware image is received at the electronic device wirelessly.

4. The method according to claim 1, comprising:
encrypting the unique device identifier to generate the representation of the unique device identifier.

5. The method according to claim 4 wherein encrypting the unique device identifier includes executing an encryption function from a secure element, the secure element separate from the memory arranged to store instructions executed by the processor.

6. The method according to claim 1 wherein generating the random number includes executing a random number generation function from a secure element, the secure element separate from the memory arranged to store instructions executed by the processor.

7. The method according to claim 1 wherein computationally combining the random number and the representation of the unique device identifier to create the device-binding value includes:
accepting the random number and the representation of the unique device identifier as inputs to a logic function, the device-binding value produced as an output of the logic function.

8. The method according to claim 1, wherein the hash function includes an exclusive-OR logic function.

9. The method according to claim 1 wherein generating the firmware address-offset from the device-binding value includes:
selecting a determined number of bits of the device-binding value.

10. The method according to claim 1,
identifying a first address in the memory; and
storing obfuscation data in the memory between the first address and the firmware address-offset.

11. The method according to claim 1, further comprising:
booting the electronic device;
retrieving the unique device identifier;
retrieving the generated random number;
computationally combining the random number and the representation of the unique device identifier using the hash function to create the device-binding value;
generating the firmware address-offset from the device-binding value; and
executing with the processor instructions retrieved from the memory at address locations based on the firmware address-offset.

12. The method of claim 11 wherein the executing the retrieved instructions includes storing data at physical addresses in the memory based on the generated data address-offset.

13. A portable computing device, comprising:
a processor;
a memory arranged to store instructions executed by the processor;
a secure element, separate from the memory; and
boot-loader logic, the boot-loader logic including boot-loader instructions executable by the processor to:
retrieve a unique device identifier;
generate a random number;
securely store the generated random number in the secure element;
computationally combine the random number and a representation of the unique device identifier using a hash function to create a device-binding value, the device-binding value being specific to the device;
generate a firmware address-offset from the device-binding value; and
generate a data address-offset, the data address-offset being specific to the device.

14. The portable computing device according to claim 13 wherein the boot-loader logic includes a hardware-based encryption module and a hardware-based true random number generator.

15. The portable computing device according to claim 13, comprising:
encryption logic, the encryption logic arranged to generate the representation of the unique device identifier.

16. The portable computing device according to claim 13 wherein the portable computing device is a mobile phone device, an Internet-of-Things (IoT) device, or a wearable computing device.

17. The device of claim 13, wherein the memory stores a vector table mapping a plurality of firmware functions based on the firmware address-offset and the processor is configured to respond to a processor interrupt by:
retrieving an interrupt vector from the vector table;
retrieving instructions from a non-volatile portion of the memory based on the interrupt vector; and
executing the retrieved instructions.

18. A non-transitory computer-readable storage medium whose stored contents configure a computing system to perform a boot-loader method, the boot-loader method comprising:
generating a random number;
securely storing the generated random number in a secure element;
creating a device-binding value by computationally combining, using a hash function, the generated random number with a value that uniquely represents a portable device;
generating a firmware address-offset from the device-binding value;
storing instructions in a non-volatile memory based on the address-offset; and
generating a data address-offset specific to the portable device.

19. The non-transitory computer-readable storage medium according to claim 18 whose stored contents configure the computing system to perform the boot-loader method, wherein the instructions are stored as firmware arranged to direct operations of the portable device.

20. The non-transitory computer-readable storage medium according to claim 18 whose stored contents configure the computing system to perform the boot-loader method, the boot-loader method comprising:
retrieving a unique device identifier; and
encrypting the unique device identifier to generate the value that uniquely represents the portable device.

* * * * *

UNITED STATES PATENT AND TRADEMARK OFFICE
CERTIFICATE OF CORRECTION

PATENT NO. : 10,949,537 B2  
APPLICATION NO. : 16/175699  
DATED : March 16, 2021  
INVENTOR(S) : Maurizio Gentili Page 1 of 1

It is certified that error appears in the above-identified patent and that said Letters Patent is hereby corrected as shown below:

In the Claims

<u>Column 16, Line 53, Claim 2:</u>
"the memory based on the interrupt vector;" should read, --the memory based on the interrupt vector; and--.

<u>Column 17, Line 11, Claim 8:</u>
"The method according to claim 1," should read, --The method according to claim 1--.

<u>Column 17, Line 18, Claim 10:</u>
"The method according to claim 1," should read, --The method according to claim 1, comprising:--.

Signed and Sealed this  
Twenty-ninth Day of June, 2021

Drew Hirshfeld  
*Performing the Functions and Duties of the*  
*Under Secretary of Commerce for Intellectual Property and*  
*Director of the United States Patent and Trademark Office*